(No Model.) 2 Sheets—Sheet 1.

C. F. MILBURN, G. E. BYRKIT & J. C. CRABBS.
LATHE FOR TURNING WAGON AXLES.

No. 474,995. Patented May 17, 1892.

WITNESSES
Carroll J. Webster
R. H. Elliott

INVENTORS
Charles F. Milburn
George E. Byrkit
John C. Crabbs
By Myers & Webster
Attys.

(No Model.) 2 Sheets—Sheet 2.
C. F. MILBURN, G. E. BYRKIT & J. C. CRABBS.
LATHE FOR TURNING WAGON AXLES.

No. 474,995. Patented May 17, 1892.

WITNESSES
Carroll J Webster
R M Elliott

INVENTORS
Charles F. Milburn
George E. Byrkit
John C. Crabbs
By Myers & Webster
Attys

UNITED STATES PATENT OFFICE.

CHARLES F. MILBURN AND GEORGE E. BYRKIT, OF TOLEDO, AND JOHN C. CRABBS, OF AUBURNDALE, OHIO.

LATHE FOR TURNING WAGON-AXLES.

SPECIFICATION forming part of Letters Patent No. 474,995, dated May 17, 1892.

Application filed July 18, 1890. Serial No. 359,143. (No model.)

*To all whom it may concern:*

Be it known that we, CHARLES F. MILBURN and GEORGE E. BYRKIT, of Toledo, and JOHN C. CRABBS, of Auburndale, all in the county of Lucas and State of Ohio, have invented certain new and useful Improvements in Lathes for Turning Wagon-Axles; and we do hereby declare that the following is a full, clear, and exact description of the invention, which will enable others skilled in the art to which it appertains to make and use the same, reference being had to the accompanying drawings, and to the figures of reference marked thereon, which form part of this specification.

This invention relates to a lathe for turning wagon-axles.

The object of the invention is to provide a duplex cutting mechanism adapted to form an axle of a blank when properly adjusted relatively to the cutters.

In the manufacture of axles out of wood it is necessary to perform the work in an expeditious manner to cheapen the product, and in view of the irregularity of the grain it is necessary, in order to avoid riving the grain of the wood, to work from the center of the blank toward the end thereof while the end cutter is cutting with the grain from the end toward the center, thereby insuring a smooth and finished axle without possibility of riving or splitting the grain.

With these objects in view the invention consists in providing a lathe having a cutter-head adapted to cut from the center of the axle to the spindle, with a supplemental cutter-head adapted to cut from the spindle to the center of the axle.

In the accompanying drawings, forming part of this specification, and in which like numerals of reference indicate corresponding parts, we have illustrated one form of lathe armed with two cutter-heads, and embodying the essential features of our invention, although the same may be carried into effect in other ways without in the least departing from the spirit thereof, and in these drawings—

Figure 1:
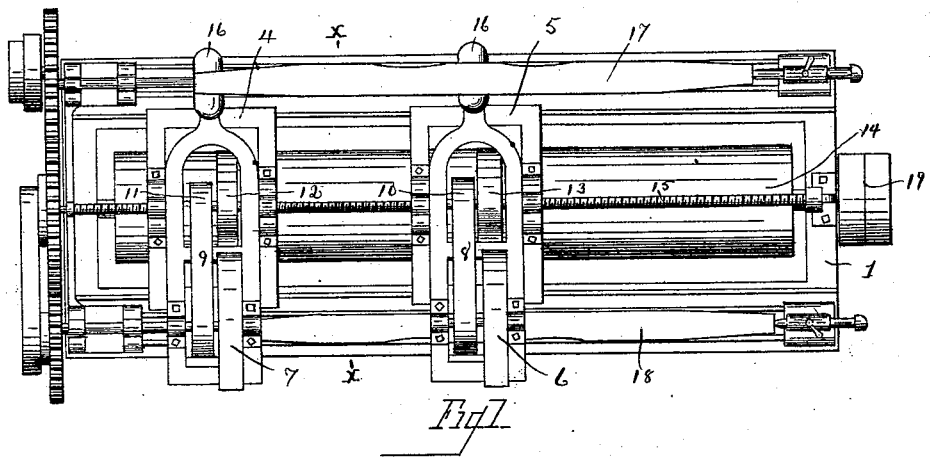
Figure 2:
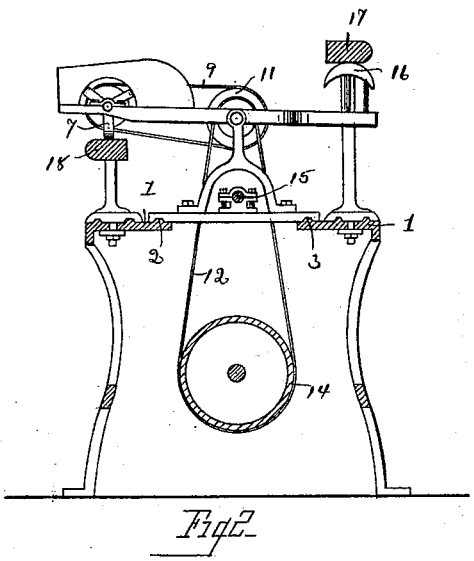
Figure 3:
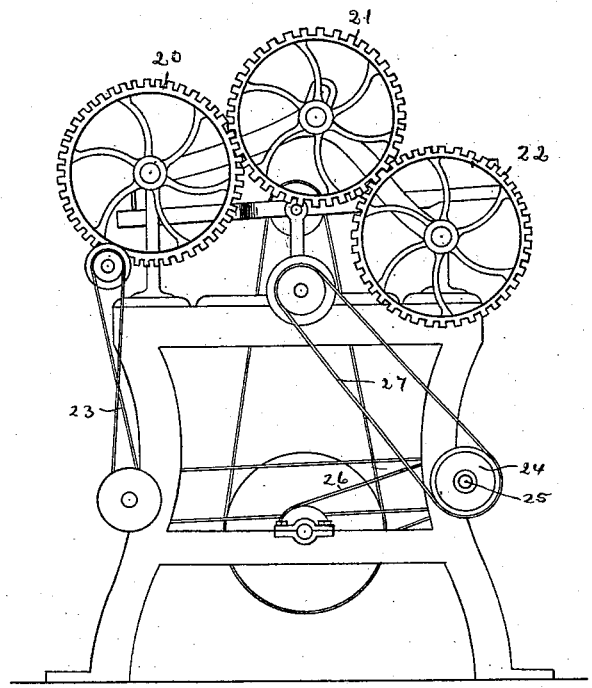

Figure 1 is a top plan view of a lathe, showing the same armed with two cutter-heads. Fig. 2 is a vertical transverse sectional view taken on the line $x$ $x$ of Fig. 1, and Fig. 3 is an end view showing the mechanism for actuating the former and blank.

In carrying out our invention we employ any of the usual or preferred forms of rotary cutters; but for the purpose of clearness of description the specific form of cutter and mechanism for actuating the same illustrated in the drawings will be explained.

Referring to the drawings, 1 designates a rectangular frame-work, which is supported at each end upon suitable legs. The frame-work is provided with tracks 2 and 3, upon which move rectangular frames 4 and 5, carrying the cutter-heads 6 and 7, the cutter-head 6 being arranged in the center of the machine and the cutter-head 7 at the end. Upon the shafts carrying the cutter-heads are mounted pulleys, around which pass belts 8 and 9 to pulleys 10 and 11, mounted on shafts journaled in frames 4 and 5, the latter pulleys being actuated by belts 12 and 13, which pass around a drum 14, mounted below the cutter-heads. The two frames carrying the cutter-heads are reciprocated and are held in proper adjustment with relation to each other by means of a screw-shaft 15, journaled in suitable bearings upon the frame-work 1. As is usual in lathes of this construction, the end of the frame-work in which the cutter-head is journaled carries a tracer 16, which is adapted to engage with a former 17, and thus cause the cutters to reproduce upon the blank 18 the exact configuration of the former.

In operation power is communicated to the drum by means of a pulley 19, around which passes a belt (not shown) connecting with a suitable source of power. As the drum revolves, motion is imparted to the cutter-heads by means of the belts 12 and 13 in the manner described, while the former and blank are caused to revolve in opposite directions by means of a series of gear-wheels 20, 21, and 22, the center one 21 being an idler, motion being imparted to the said series by a belt 23, which takes motion from a pulley 24, mounted on a shaft 25, which latter is actuated by a belt 26, taking motion from a pulley mounted in the drum-shaft. The screw-shaft 15 is also actuated by the latter shaft through a belt 27.

As stated, the cutter-head 6 is located at the center of the machine and the head 7 at the end. It follows that when the machine is in operation the two heads will accomplish the cutting of an axle in one-half the time required by one cutter head, and by having the axle arranged so that the center-head will cut against the grain all danger of riving the grain of the wood or of splitting the same will be overcome. As soon as one axle has been completed another may be replaced in the machine, and the cutter-heads in assuming their normal or initial position will cut the axle to the desired contour, thus saving time in obviating the necessity of having the cutting begin at one end of the machine at all times.

Having thus fully described our invention, what we claim as new, and desire to secure by Letters Patent, is—

In a lathe for turning wagon-axles, the combination, with a screw-shaft and mechanism for revolving the same, of a former of the contour of a completed axle, and a plurality of independent cutter-heads, each carrying a cutter, and a tracer for engaging the said former, one of said heads being located at or near one end of said shaft and the other at or near its center, whereby when the shaft is revolved one of the cutters will cut from the center to the end of the axle while the other is cutting from the end to the center, thus completing an axle in one operation.

In testimony that we claim the foregoing as our own we hereby affix our signatures in presence of two witnesses.

CHARLES F. MILBURN.
   GEORGE E. BYRKIT.
   JOHN C. CRABBS.

Witnesses:
 WILLIAM WEBSTER,
 R. M. ELLIOTT.